April 12, 1955  W. J. CALDWELL  2,705,978
TAPING MACHINE
Filed Feb. 17, 1950  11 Sheets-Sheet 2
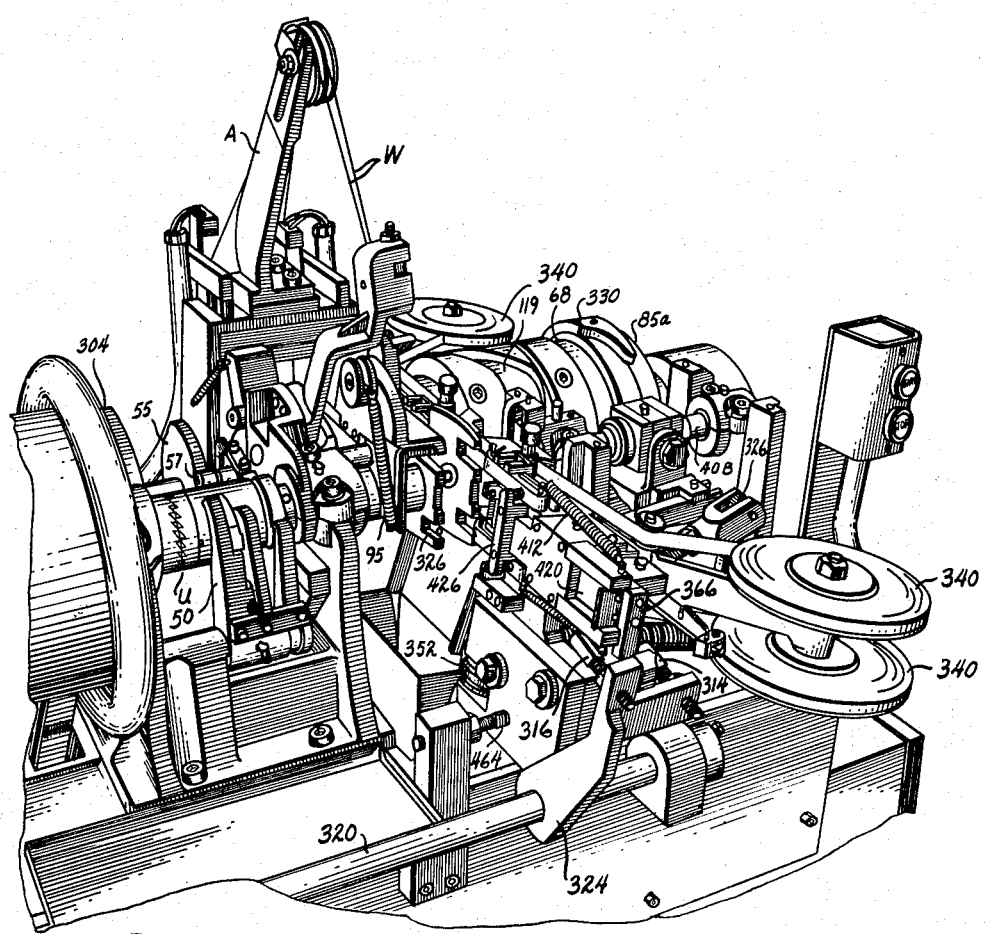
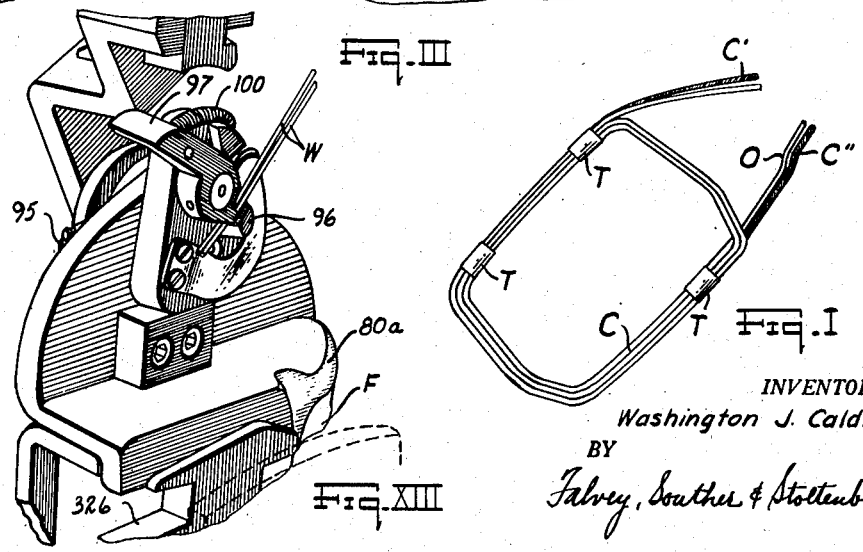
INVENTOR.
Washington J. Caldwell
BY
Falvey, Souther & Stoltenberg

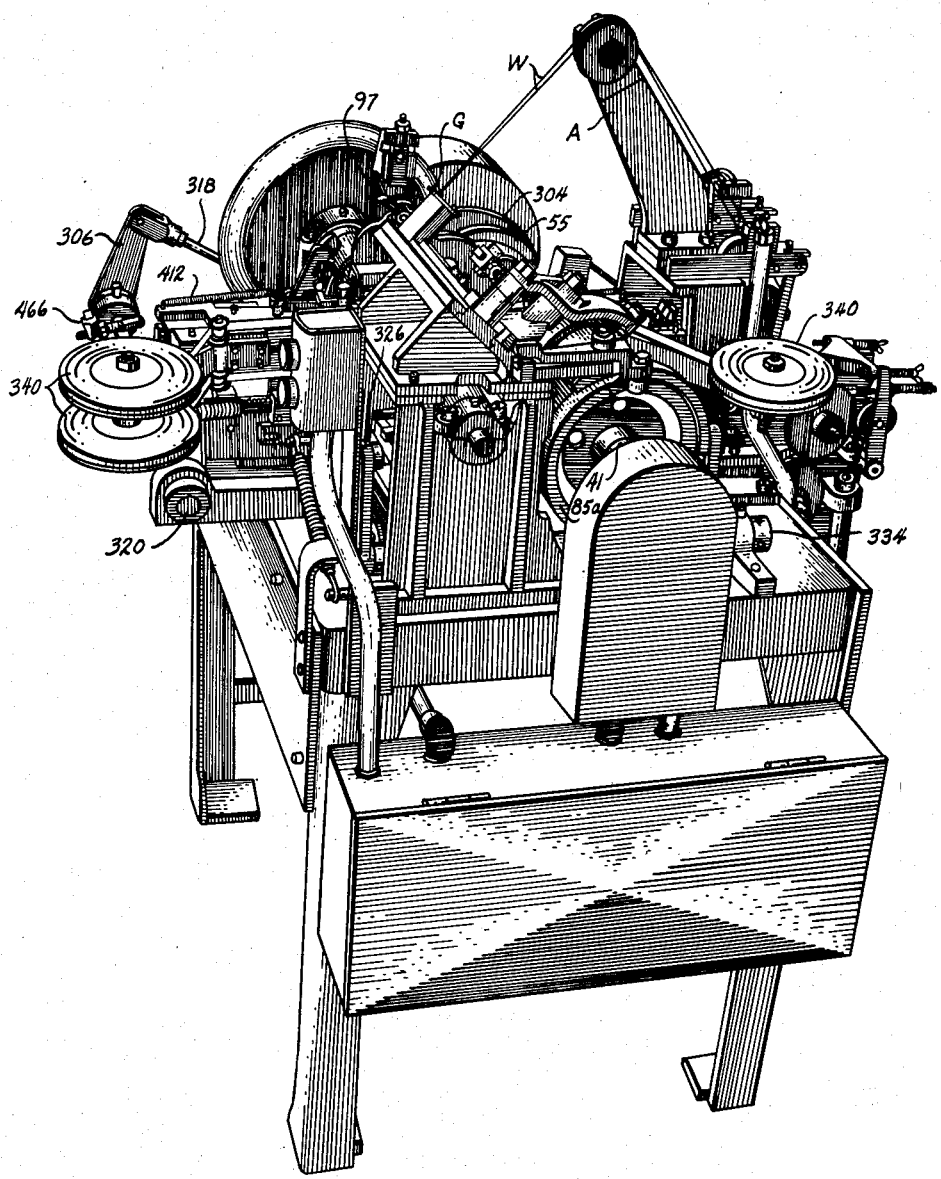
Fig. II

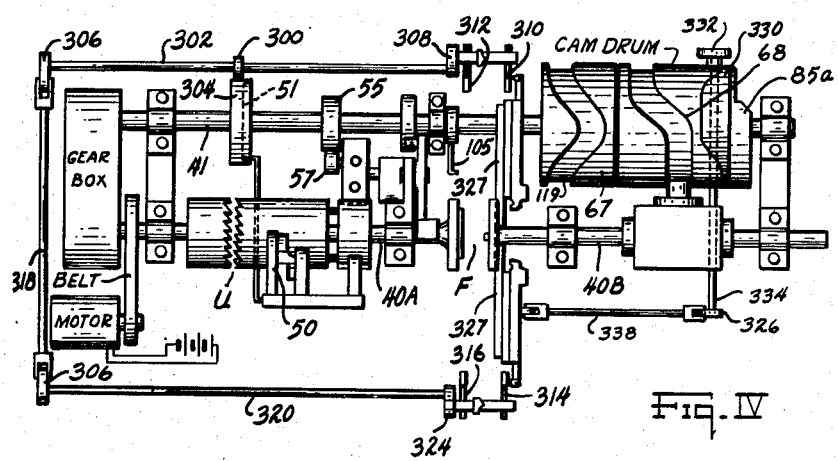
Fig. IV
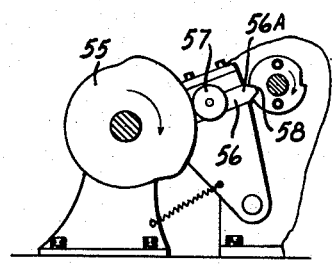
Fig. XI
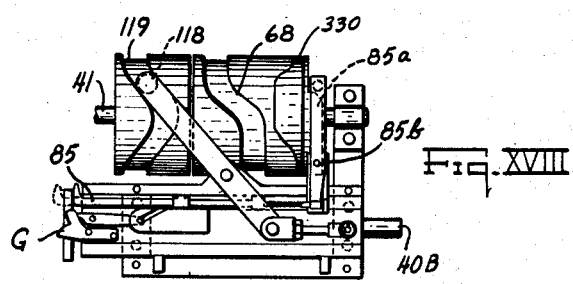
Fig. XVIII
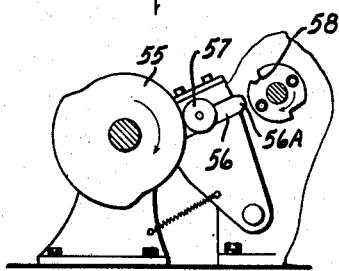
Fig. X
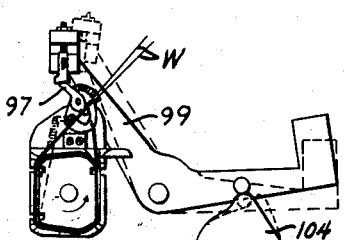
Fig. XIV
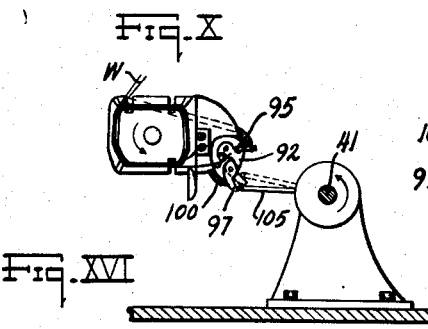
Fig. XVI
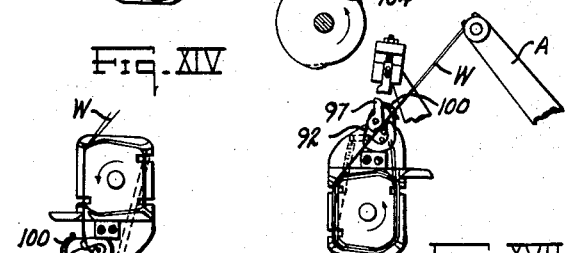
Fig. XV
Fig. XVII
INVENTOR.
Washington J. Caldwell
BY
Falvey, Souther & Stoltenburg April 12, 1955
W. J. CALDWELL
2,705,978
TAPING MACHINE
Filed Feb. 17, 1950
11 Sheets-Sheet 4
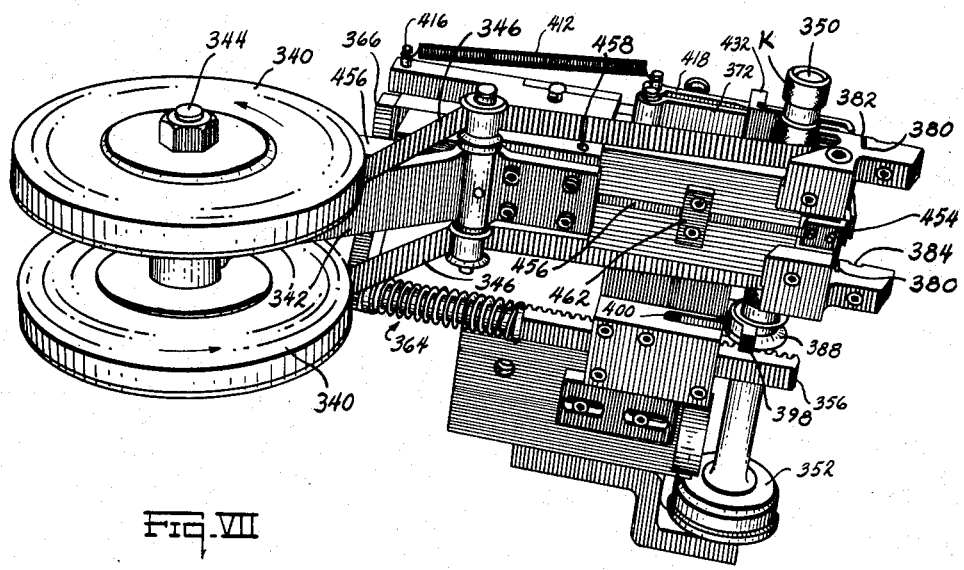
Fig. VII
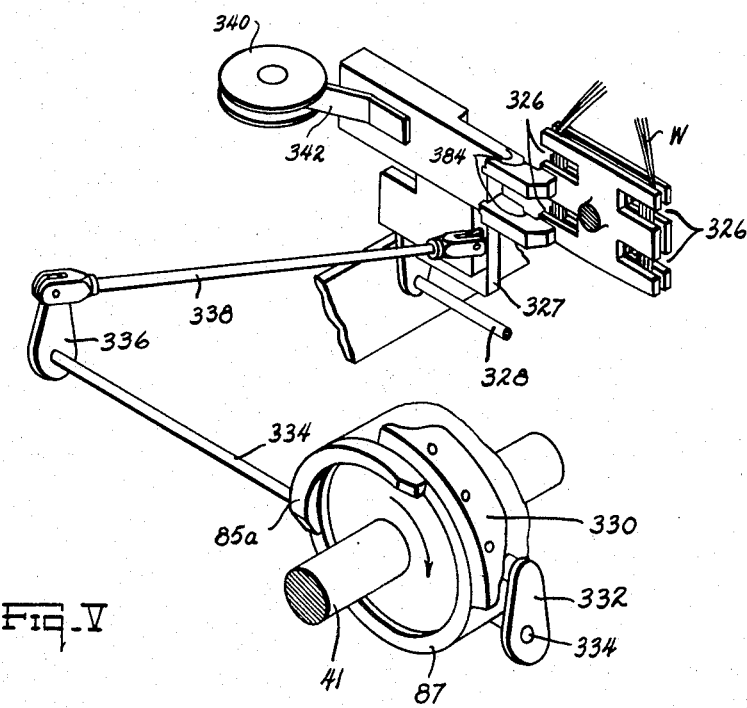
Fig. V
INVENTOR.
Washington J. Caldwell
BY
Falvey, Souther & Stoltenberg

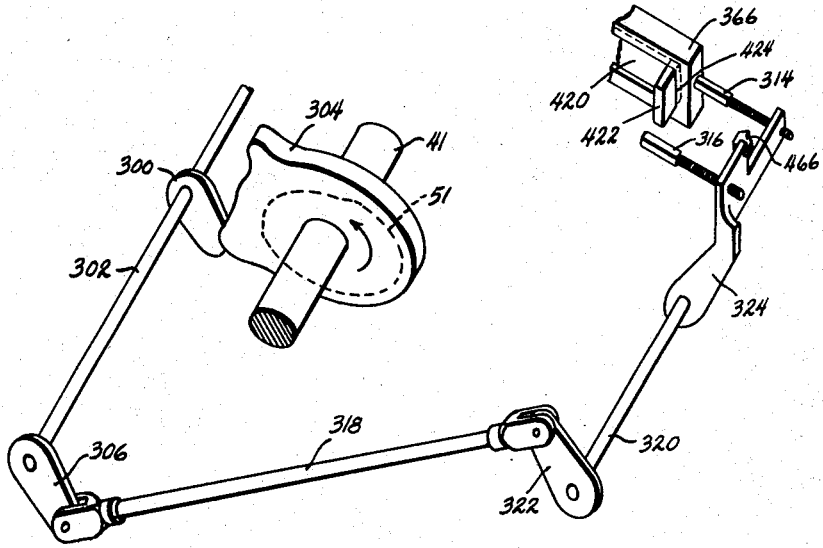
Fig. VI
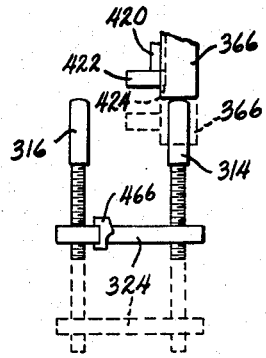
Fig. XXIV
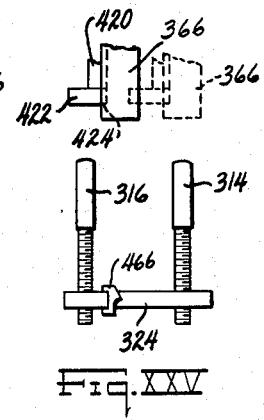
Fig. XXV
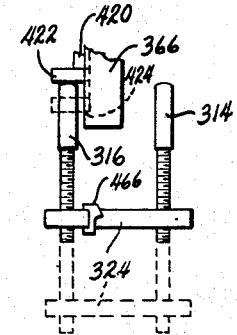
Fig. XXVI

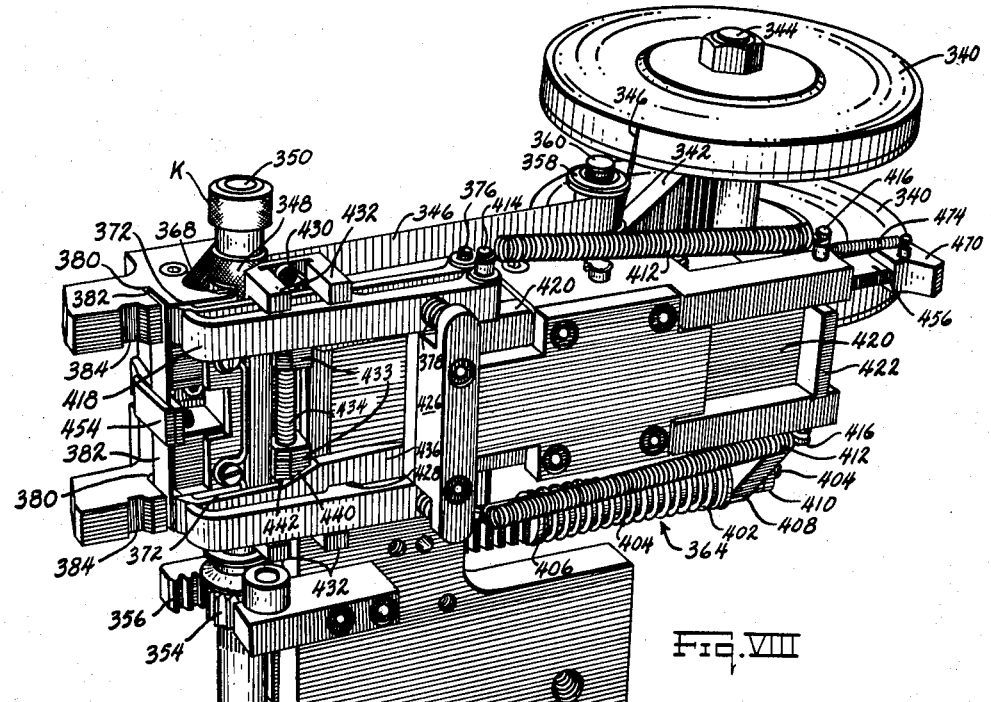
Fig. VIII
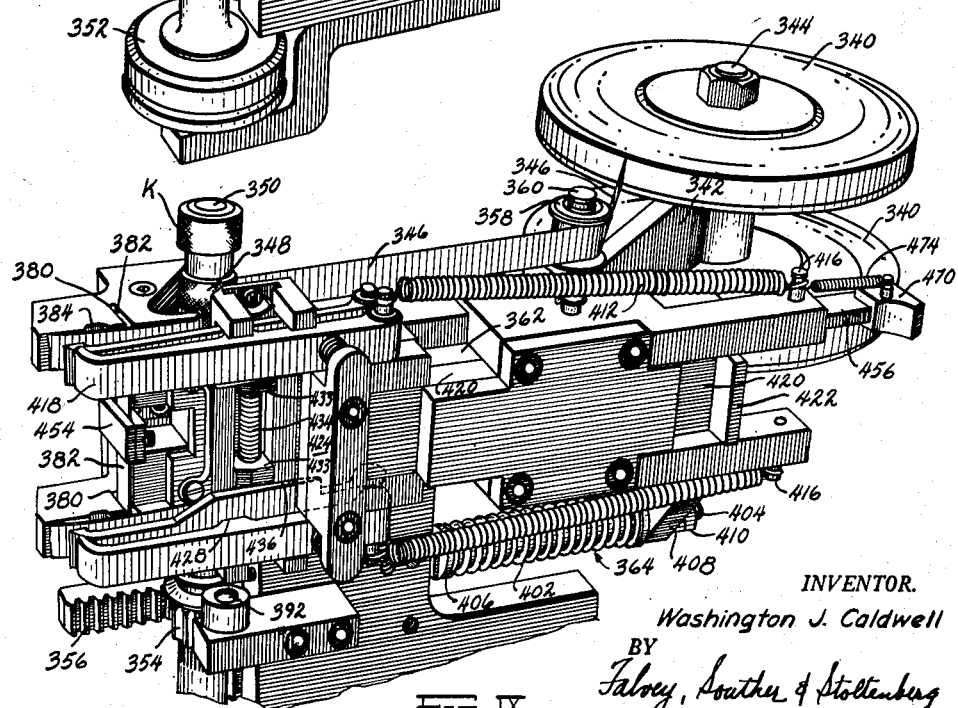
Fig. IX
INVENTOR.
Washington J. Caldwell

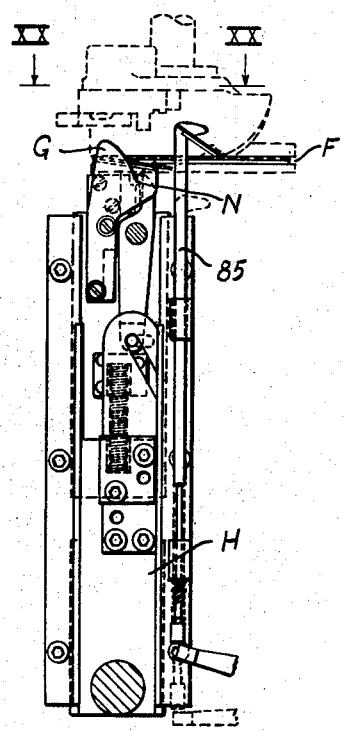
Fig. XIX
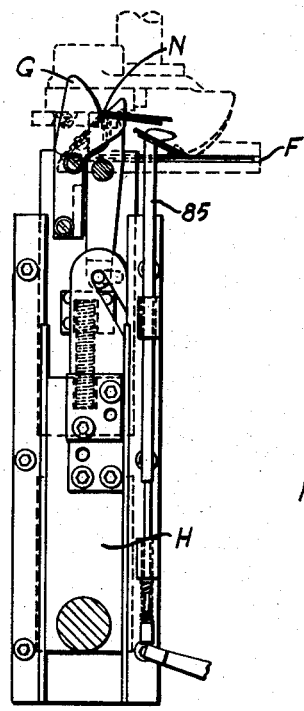
Fig. XXI
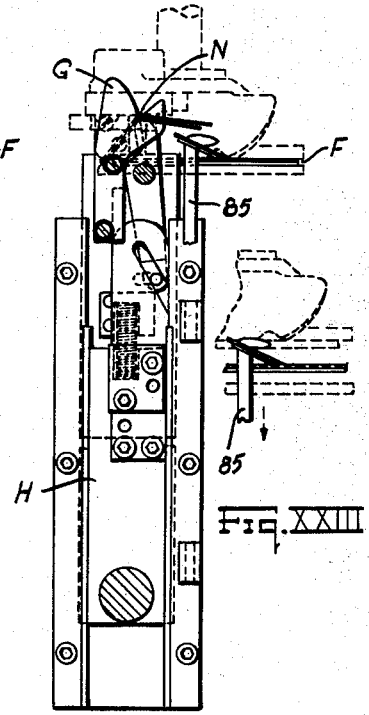
Fig. XXII
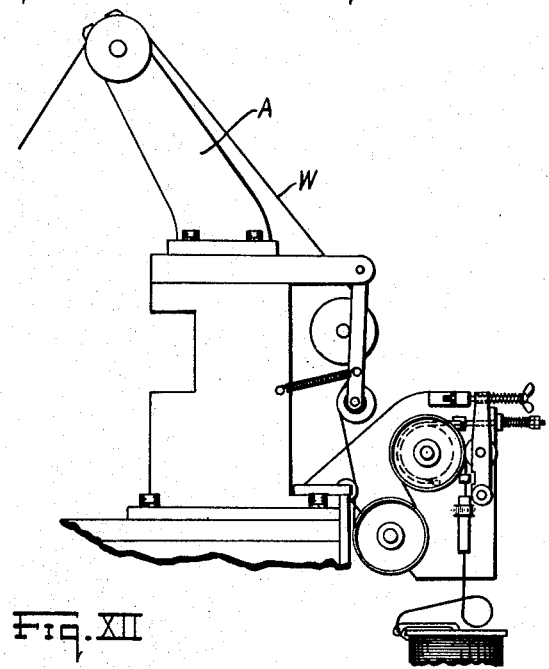
Fig. XII
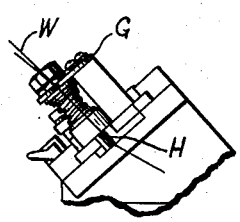
Fig. XX
INVENTOR.
Washington J. Caldwell
BY
*Falvey, Souther & Stoltenberg*

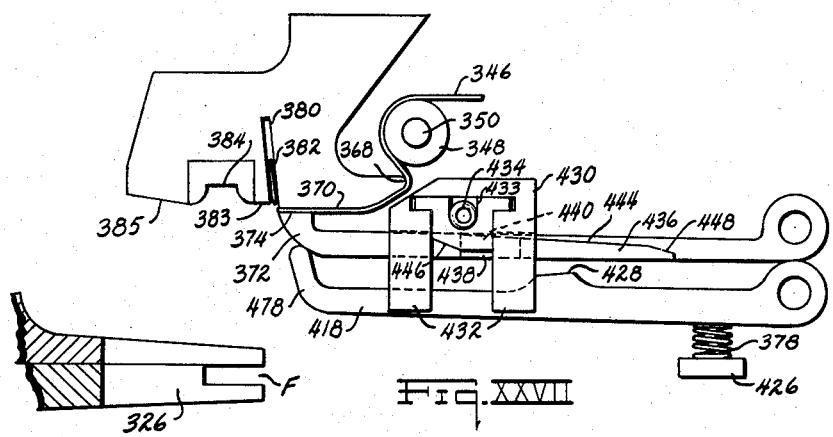
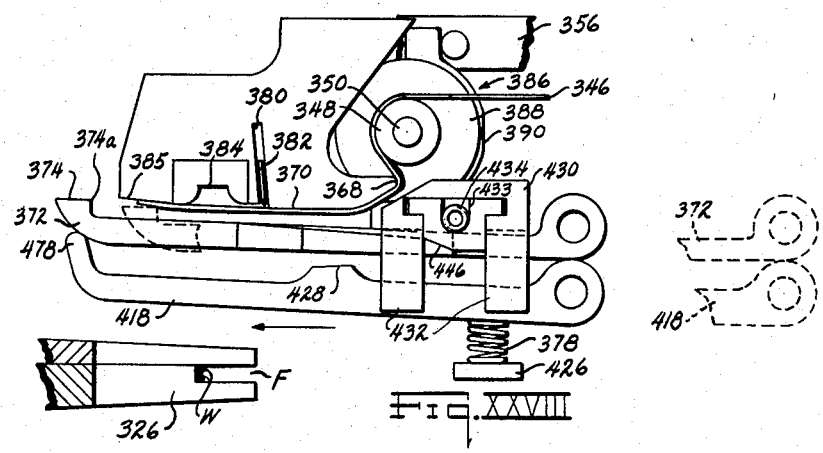
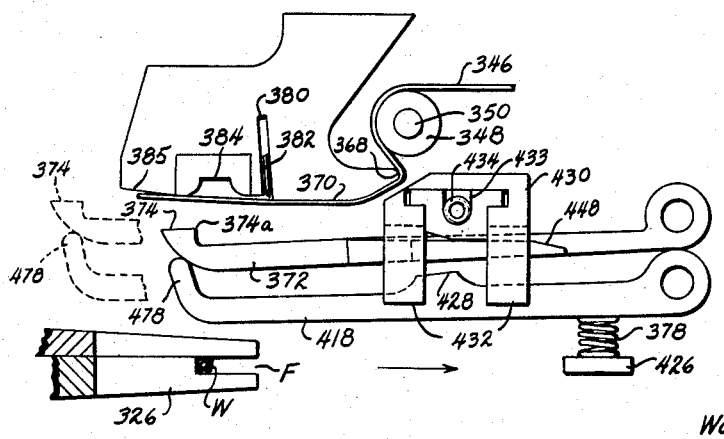

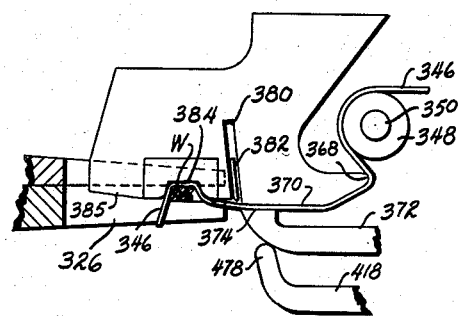
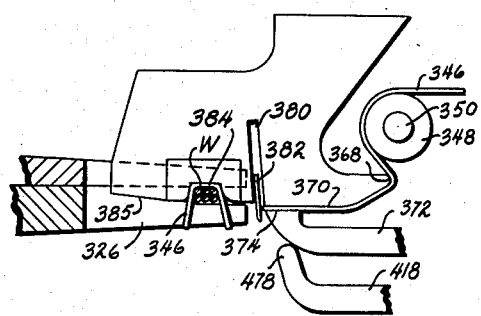
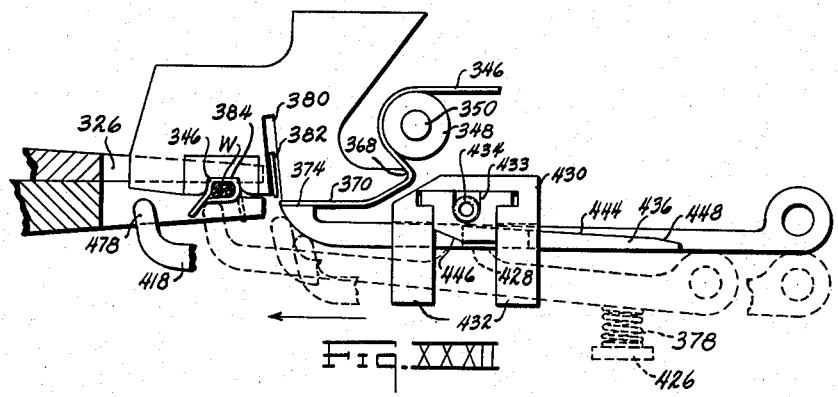
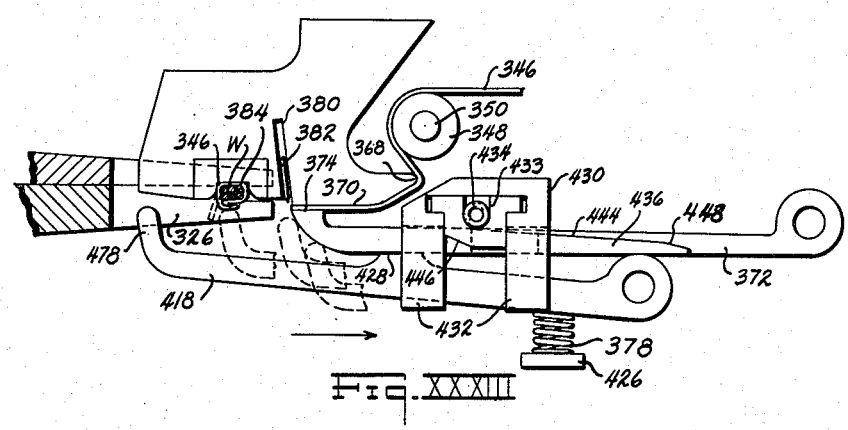

April 12, 1955     W. J. CALDWELL     2,705,978
TAPING MACHINE
Filed Feb. 17, 1950     11 Sheets-Sheet 10
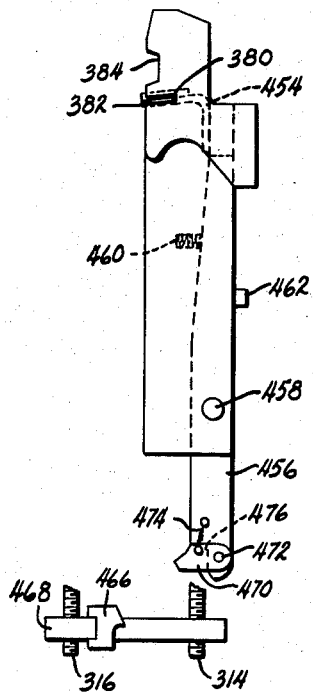
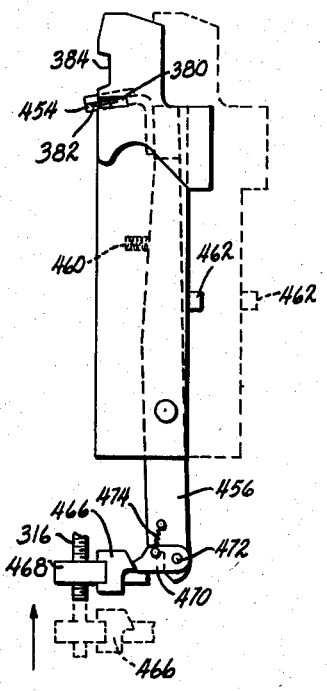
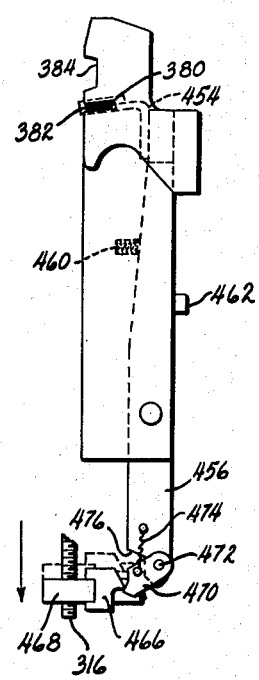
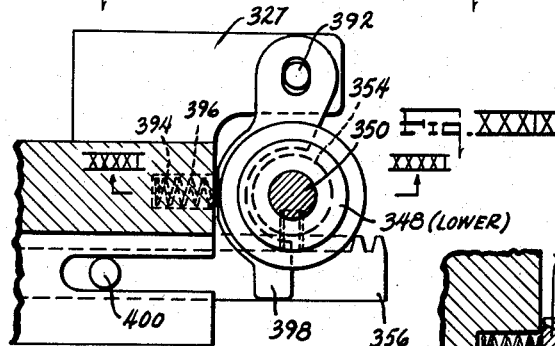
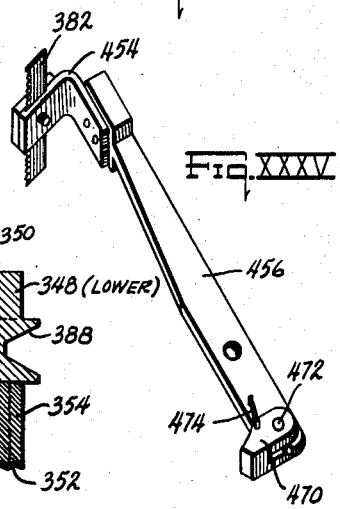
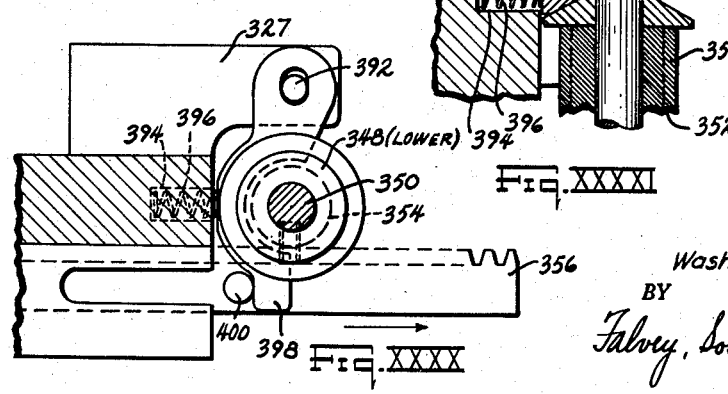
INVENTOR.
Washington J. Caldwell
BY
Falvey, Southee & Stoltenberg

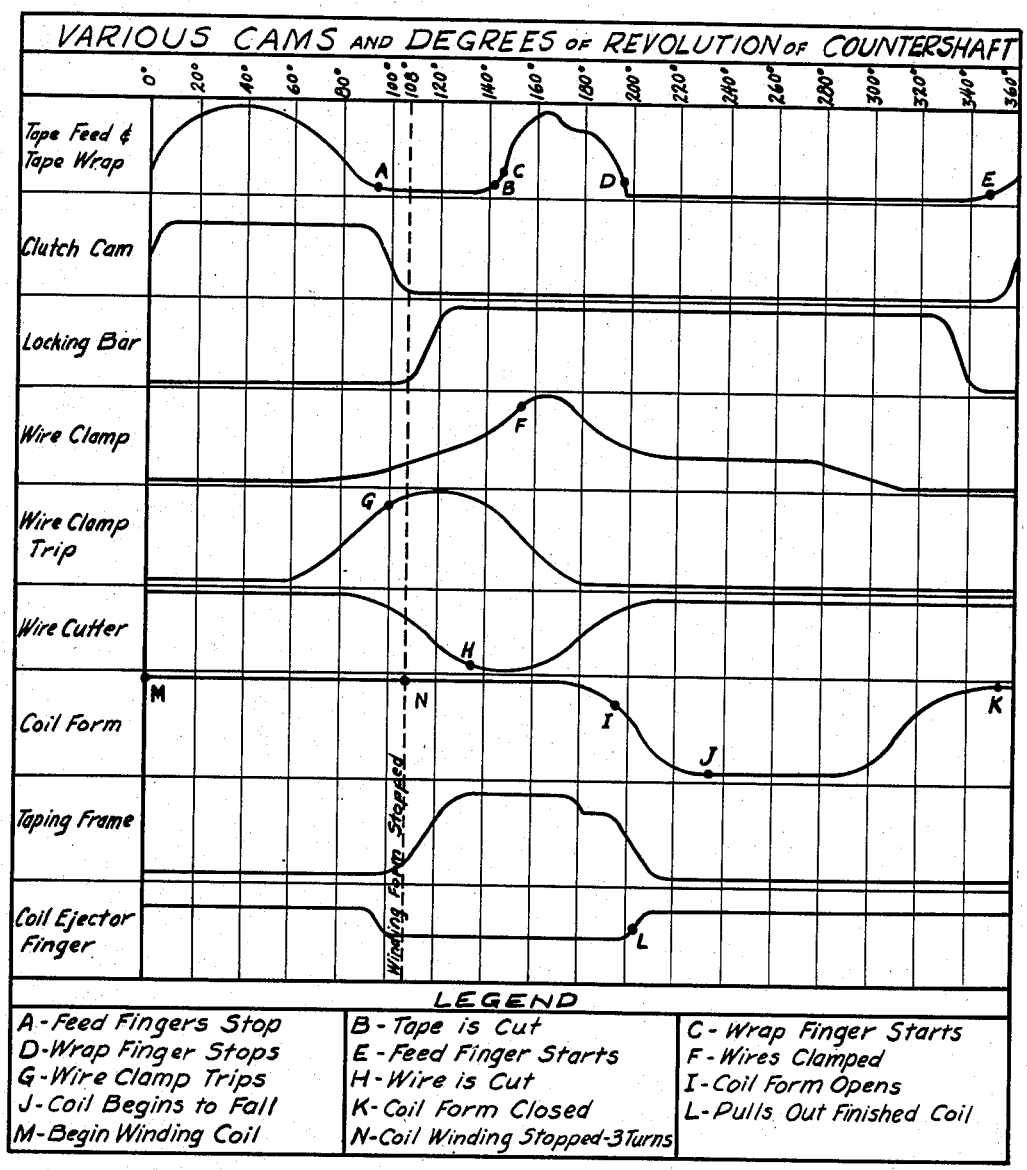

United States Patent Office 2,705,978
Patented Apr. 12, 1955

2,705,978

TAPING MACHINE

Washington J. Caldwell, Toledo, Ohio

Application February 17, 1950, Serial No. 144,785

10 Claims. (Cl. 140—1)

This invention relates to coil winding methods and to machines embodying such methods. More particularly it relates to the method of and a machine for winding armature coils for automotive generators which are automatically taped and ready to be positioned in the slots of the armature.

This invention contemplates the provision of a coil winding machine for winding form-wound coils for use in the armature slots of an automotive generator, the coils being fully prepared for immediate use as the next step in a production line to be positioned in its final position in the armature. To accomplish this purpose, tape is automatically positioned in at least three positions on the coil sides, while the coil is still in the winding form, so as to hold the coil in its desired form until it is finally positioned on the generator armature.

The invention further contemplates the provision of a method of manufacturing armature coils for use with an automotive generator which is complete in one step and which can be embodied in a machine which is capable of automatic operation on a production line.

It is a principal object of this invention to provide an automatic machine which winds armature coils for use with an automotive generator from continuous strands of wire which are form-wound and provided with holding means in the form of encircling bands of tape positioned on the coils while still in the winding form of the machine, so that when the completed coil is automatically removed from the machine, it is suitable for immediately positioning in the slots of the generator armature in a production line.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. I is a plan view of a completed coil wound by the method to be disclosed hereinafter as it is automatically issued by the machine incorporating the method;

Fig. II is a perspective view of the machine looking at one side thereof;

Fig. III is a perspective view of the machine looking from the left of Fig. II, one portion of the machine having been removed for clarity;

Fig. IV is a plan view showing the principal driving elements of the machine with the winding form in open position;

Fig. V is a perspective view of the driving elements which move the taping device into cooperative relation with the winding form;

Fig. VI is a perspective view of the driving elements which actuate the tape-controlling elements of the taping device;

Figs. VII, VIII, and IX are perspective views of the details of the complete taping device in various operating positions;

Figs. X and XI are elevational views of the winding form locking device in rotating and locking positions respectively;

Fig. XII is an elevational view of the wire tensioning and guiding device;

Fig. XIII is a perspective view of the locking device for the ends of the wire strands;

Figs. XIV, XV, XVI, and XVII are elevational views of the locking device for the ends of the wire strands showing the sequence of locking and unlocking;

Fig. XVIII is a plan view of the wire positioning and cutting device relative to the locking device with its driving means;

Fig. XIX is a plan view of the wire positioning and cutting device in retracted position for the winding portion of the cycle;

Fig. XX is an elevational view taken along line XX—XX of Fig. XIX;

Fig. XXI is a plan view of the wire positioning and cutting device in advanced position where the wire strands are fitted into the locking device with the wire cutters in position for severing the completed coil from the strands of wire;

Fig. XXII is a plan view similar to XXI with the wire cutter in actuated position after cutting the completed coil free;

Fig. XXIII is a plan view of a detail which shows the completed coil being removed from the opened winding form;

Figs. XXIV, XXV, and XXVI show the various operative positions of the driving relations of the driving means for the taping device shown in Fig. VI;

Figs. XXVII, XXVIII, XXIX, XXX, XXXI, XXXII, and XXXIII are plan views, partly in section, of the cooperative relation between the taping device and the winding form, showing the operational sequence in a series of steps in the separate figures;

Fig. XXXIV is a sectional view of a fully taped coil taken at the point where tape has been applied;

Fig. XXXV is a perspective view of the tape cutter as detached from the taping device;

Figs. XXXVI, XXXVII, and XXXVIII are plan views of the tape cutter and its actuating mechanism showing its action by steps;

Figs. XXXIX and XXXX are plan views, partly in section, of a detail of the tape advancing and locking device;

Fig. XXXXI is a sectional elevation taken along the line XXXXI—XXXXI of Fig. XXXIX, and Fig. XXXXII is a timing plan of the cam action of the elements of the machine.

The invention disclosed herein relating to methods of winding armature coils for automotive generators and machines incorporating such methods, is an improvement of the method and machine disclosed in Patent No. 2,154,792, issued to Karl H. Weber on April 18, 1939.

Referring now to the drawings, particularly to Figs. II and III, and comparing the disclosure of these figures to the disclosures in the aforementioned Weber patent, it will be apparent that the mechanism for rotating and controlling the coil form, the coil form itself, the wire controlling and cutting means and their driving means are substantially the same as shown in the patent and there is no need to describe these elements in full detail as reference can be made to the disclosure of the aforementioned patent. Like reference numerals have been applied where such could be utilized for clarity. The principal difference between the Weber disclosure and the disclosure of the present invention lies in the application of a holding means for the completed coil, which, in the Weber patent, consists of holding clips which are subsequently removed manually when an operator positions tape on the coil by manual means, whereas, in the present method disclosed herein, the tape is automatically applied by the machine before the coil is removed from the winding form so as to obviate completely the manual operations hereinbefore necessary before the completed coil was suitable for use in the fabrication of the generator armature. In the coil as it issued from the machine described herein, the tape is already applied and the completed coil as it issues from the machine is ready for immediate use in a production line for the operation of positioning the coil in the slots of the generator armature.

The machine disclosed in the Weber patent has been modified by substituting for the clip-attaching mechanism, which has been removed entirely, a taping mechanism which applies three sections of tape, two sections on one coil side with the third section on the opposite coil side, as shown in Figs. I and XXXIV, while the coil is still in the winding form so that when the completed coil is removed from the machine by opening the coil winding form with displacement of the tail stock, it is ready for immediate use without further manual operations such as were necessary with the Weber machine. The changes necessary in the machine to accomplish these purposes and objects will be described in detail hereinafter.

For a clearer understanding of the method and the machine incorporating the method, the cycle of operation will be set forth in the beginning, disclosing the basic elements of the machine common to both as shown in the Weber patent and the machine as modified in the present disclosure. Thereafter the taping mechanism will be disclosed and the new cycle of operation will be set forth.

The wire used in forming the coils is supplied to the machine in spools which are mounted adjacent thereto in any convenient manner, the wire strands W being led from the spools to the wire straightening and tensioning devices as shown in Fig. XII. Positioned between the wire straightening devices and the winding form F, an upwardly projecting arm A is provided to direct the wire from the wire straightening device into the winding form F, preferably at a steep angle by leading the wire from the top of two pulleys to the clamping devices on the head piece of the winding form as shown in Figs. XVII and XIV.

The number of wires used in the winding operation for forming the coils is optional. A multiplicity of wires is preferably used, depending upon the design of the armature in which the completed coils are to be incorporated. In the drawings, a coil having two wires has been illustrated in connection with the automatic machine disclosed.

The main shaft 40A of the machine with the incorporated winding form F is driven directly from the primary power source by a driving belt (Fig. IV), intermittent rotation of the winding form being obtained by the use of a saw-tooth clutch U. The countershaft 41 is driven by a gear train from the constantly rotating drive portion of the saw-tooth clutch and rotates preferably one revolution for twelve revolutions of the driver portion. Positioned on the countershaft 41 are cam means which actuate the various supplemental devices cooperating with the winding form F to obtain full automatic operation of the machine which may thereby operate steadily with no special attention of an operator other than to replenish the source of materials, without which the machine is inoperative, for example, the wire etc. The time relations between the main shaft and the countershaft during the cycle of operation are based upon the speed ratio as determined by the interconnecting gear train positioned in a gear box, while the sequential operation of the supplemental devices cooperating with the winding form is attained by the angular displacement between the various cams of the cam drum 67 mounted on the countershaft 41.

Assuming for convenience in description that the cycle of operation of the automatic coil winding machine begins with the winding form F in open condition, a description of the sequential operation of a complete cycle in the winding coil will be given. With the winding form F open, the automatic coil winding machine has released the just wound coil from the winding form by the longitudinal movement of the tail piece on the shaft portion 40B, the coil C being held in form by strips of attached tape T, as is best seen in Fig. I, which is accomplished by a mechanism which will be described in further detail hereinafter. The leading ends of the wires W are tightly held in the clamping mechanism on the head piece, as is best illustrated in Fig. XIII.

The cam path 68 on the periphery of the cam drum 67 moves the tail piece from its cooperative relation with the head piece which will allow the removal of the completed coil. The head piece, during this portion of the operative cycle, is held in locked position by the locking mechanism shown generally in Figs. X and XI. The saw-tooth clutch is disengaged just prior to the operation of the locking mechanism, so that the head piece may be rigidly held in upright position. The countershaft 41, rotating continuously 1/10 the speed of the driver portion of the sawtooth clutch, causes the cam path 68 to move the tail piece again into cooperative relation with the head piece to allow the winding form F to assume the position necessary for the winding of a new coil.

With the head piece and tail piece in cooperating relation, the winding form is in closed condition and ready for the beginning of a new winding cycle. The locking mechanism shown in Figs. X and XI is released at this time by the cam rider 57 contacting the low portion of the cam 55 to retract the bar 56 and disengage the projection 56A from the slot 58. Simultaneously, the driven portion of the saw-tooth clutch U is released by the cam lever 50 and its resilient means shifts it into engaging relation with the driver portion, so that the winding form F will begin to rotate. The head piece and tail piece rotate together, the driving force being transmitted from the head piece to the tail piece by a locking pin therebetween.

The initial pull of the head piece on the leading ends of the wires W displaces the clamp block 92 approximately 90 degrees about its pivot against the pull of the spring 95 to the position shown substantially in Figs. XV and XVI. The wires W issuing from the pulleys on the arm A to a clamp block 92 on the head piece are slightly displaced from the winding plane of the winding form and during the first 90 degrees of rotation, the wires are guided into the winding form F by contacting the chamfered smooth edges of the lateral projection 80A on the head piece (Fig. XIII). Thereafter the wires will smoothly wind into the form for a predetermined number of turns from the pulleys without interference.

After the predetermined number of turns have been wound into the form (not necessarily the total number of turns to complete the coil), the leading end of the wire is released from the clamp block 92 on the head piece by the action of finger 105 (as shown in Fig. XVI) contacting the movable portion 97 of the clamp. The countershaft 41 rotates to bring the finger 105 into the path of rotation of the movable portion 97 of the clamp, so that the resulting impact between the parts will displace the movable portion in a clockwise direction about its pivot. This action releases the grip of the clamping jaws on the leading end of the wire and completely frees the leading end of the wire from the head piece. The coil may not unwind even though its end is free because the subsequently-wound turns overlap the first turn and prevent it from being displaced.

The form F continues its rotation in the interim until the required number of turns have been wound into the form to complete the winding portion of the cycle. The clamp block 92, no longer influenced by the pull of the leading wires of the coil, is snapped back to its original position by the action of the resilient means 95 and by the centrifugal force of rotation of the head piece to the position shown in Fig. XVII. In this position, the clamp block 92, with its jaws open under the influence of the resilient means 100 after being unlocked, cooperates with the clamping and wire cutting mechanisms whose actions are to be described hereinafter.

After the full number of turns have been wound into the winding form, the cam lever 50, cooperating with cam 51 on the counter shaft 41 and the locking mechanism shown in Figs. X and XI, again operates to disengage the saw-tooth clutch U and to lock the head piece in upright position as already described. Thus the head piece and the clamp block 92 are in proper position to cooperate with the clamping and cutter mechanisms. The position of the wires W is defined by the upper left-hand corner of the winding form (Fig. XIV) and the pulleys on the guide arm A, so that they are substantially aligned with the bight of the cutting shears (Fig. XX) on the moving head H and the space between the clamp jaws 96 and 97 (Fig. XIII).

Cam rider 118 (Fig. XVIII), cooperating with the cam path 119 on the drum 67 at this time, advances the cutter head H toward the head piece by the lever mechanism, the cutter head H moving in substantially parallel juxtaposition with the main shaft 40. This advances three elements into cooperative relation with the head piece, namely, the guide G, the cutter shears, and finger 85, as shown in Figs. XIX, XX, XXI, and XXII. The guide G projects slightly further in the direction of the head piece than the cutting shears and is fitted with cam surfaces on its forward edge to collect the wires W into the notch N which aligns the wires W with the gap between the jaws of the clamping device. The guide G is spaced relatively above the clamping jaws, while the cutter shears are spaced relatively below the clamping jaws, both being positioned along the line of the wires W issuing from the winding form to the pulleys on the upper end of projecting guide arm A. The aligning action of the guide G, therefore, positions the wires W in the bight of the cutting shears for the cutting operation of the trailing end of the completed coil and also in the clamping mechanism in the space between the clamping jaws thereof to allow a new grip to be obtained by the clamping mechanism on the leading end of the next consecutive coil to be wound. The guide G has a further function to displace the wires from the plane of the winding form to the plane of the clamp block 92 as is clearly shown in Fig. XXI which shows the head H in its maximum forward position of displacement. The movement of the guide G and cutter head is limited by contact with the head piece.

Simultaneously, with the forward movement of the guide G, the bell-crank 99 is actuated by the cam 104 positioned for rotation on the countershaft 41. When the wires W are positioned between the clamping jaws of the block 92 by the guide G, the movable element 97 of the clamping device is displaced downwardly by the block on the bell-crank 99 to close the jaws thereof and grip the wires securely. The movement of these parts is clearly shown in Fig. XIV, the adjustable block on the upper end of the bell-crank contacting the element 97 to accomplish the clamping action. This gives the head piece a grip on both the trailing end of the coil, already wound, and the leading end of the next consecutive coil to be wound.

The wire cutters are also being actuated in this period and the severance of the trailing end of the coil just wound, is timed to be slightly before the actuation of the clamping jaws by the bell-crank 99, which frees the just-wound coil from the continuous wire strands and prepares the coil for removal from the winding form. However, before the coil can be removed from the winding form, securing means must be positioned on the coil sides to hold the coil in shape, which otherwise would unwind upon the opening of the winding form F. The securing means are in the form of three short pieces of tape T positioned automatically on the coil sides by a mechanism to be described in detail hereinafter and as clearly shown in Fig. I.

For a clearer understanding of the timing relations of the parts of the machine already described and as set forth in detail in the hereinbefore mentioned Weber patent, reference is made to Fig. XXXXII which shows by a series of carefully labeled graphs drawn with reference to the degrees of revolution of the cam shaft 41 the timing relation of the various elements of the automatic machine disclosed. It will be noted that the graphs start with the beginning of rotation of the coil form F which is the start of the winding period of the coil, this position being assumed to be the zero position of the countershaft 41 carrying the various cams.

Examination of these graphs shows that the winding of the coil begins at point 17 at zero degrees, with the saw-tooth clutch U in engagement to form the driving relation, such engagement being had through about 100° of rotation as shown in the second graph titled "clutch cam," at which time the winding form stops rotation. Referring to the graph titled "Wire Clamp Trip," it will be noted that the leading end of the coil just being wound is released at 100° of rotation of the countershaft. The winding form and its driving means rotate with reference to the countershaft in the ratio of 10 to 1 as already set forth. The locking bar 56 is then positioned in the slot 58, as shown in the graph titled "Locking Bar," and remains in locked position from approximately 120° of rotation to approximately 340° of rotation of the countershaft. The locking occurs after the winding period is completed and holds the winding form in upright position for the period of time in which the leading end of the wire strands are reclamped in the block 92; the trailing end of the coil just wound is severed below the block 92, and the tape elements T are positioned on the coil side by the automatic mechanism to be described in detail hereinafter.

Referring now to the first graph of Fig. XXXXII titled "Tape Feed and Tape Wrap," it will be noted that the movements of this mechanism are timed during both the coil winding period and also thereafter, which can conveniently be divided into two periods divided by the stopping of the coil winding form F which occurs at 108° of rotation as shown by the dotted vertical line across all of the graphs. The period from 0° to 108° may be considered as a preparatory phase, during which time the coil is being wound and no coperation is had therewith, while the period from 108° to 200° may be considered as the attachment phase in which the short pieces of tape are affixed to the sides of the coil which is stationary after 108° of rotation.

After the completion of the preparatory phase before 108° of rotation, the machine elements utilized for the taping step are separated from the coil form F which is then rotating in its coil winding phase to be completed at the 108° point, while after the 108° of rotation of the countershaft, the machine elements utilized for the taping step are moved into cooperative relation with the stationary winding form F for the completion of the attachment phase. The timing of this phase of the machine elements is shown in the graph entitled "Taping Frame," which clearly shows the establishment of the cooperative relation with the winding form F as beginning at about 100° of rotation and continuing to about 220° during which the tape elements T are attached to the coil. After 220° the cooperative relation is fully broken with the winding form F and the elements again enter the preparatory phase which essentially consists of a period of time in which the tape is removed from a roll and prepared for attachment to the fully wound coil.

There will now be described the machine elements for applying the tape elements T to the coil. Referring again to Fig. IV, the cam element 300, which has an internal cam 51 already referred to in connection with the saw-tooth clutch U which is opened and closed by the actuating of the cam lever 50 by the cam 51, is mounted on a shaft 302 juxtaposed in parallel relation with the countershaft 41 to have the cam element 200 cooperate with an external cam surface 304 integral with the element which forms the internal cam 51 mounted for rotation with the countershaft 41. Refer also now to Fig. VI where these elements are shown in separate relation for clarity. The shaft 302 is journaled in any convenient manner for rotation through a small angle to actuate levers 306 and 308 mounted on its ends, as is seen in part in Fig. VI and also in Fig. IV. Lever 308 actuates a pair of spaced pusher elements 310 and 312 directly while the lever 306 actuates similar spaced elements 314 and 316 on the opposite side of the machine through link 318 which actuates the shaft 320 by the arm 322 attached to its end, which then actuates the elements 314 and 316 by an arm 324 fixed to the shaft 320 carrying the elements 314 and 316. Essentially the elements 310 and 312 are the same as the elements 314 and 316 operating from opposite sides of the machine and moving toward each other simultaneously as will be further described hereinafter. Lever 308 and arm 324 are similar, in that they mount the separate pairs of spaced pusher elements 310, 312, 314, and 316 respectively. Shaft 320 is journaled for rotation in any convenient manner.

From an examination of Fig. I which shows the completed coil C as it is issued from the automatic machine, it is clear that one coil side has positioned thereon two tape elements T, while the opposite side of the coil has only one. The coil side having the two tape elements has issuing from it the trailing end C' of the coil as wound, while the coil side having only one tape element has issuing from it the leading end C'', which is distinguished by a slight offset O, which is caused by the clamping elements on the movable block 92 as shown in Figs. XIV and XV. The coil is wound in the coil form F as shown in Fig. III with the side having the two tape elements T facing toward the pusher elements 314 and 316, or the front side of the machine, while the side having the single tape element faces toward the rear of the machine toward the elements 310 and 312. There are then two tape elements controlled by the pusher elements 314 and 316 on the front side of the machine, while only a single tape element is controlled by the pusher elements 310 and 312 on the rear side. The essential elements of the machine for attaching each of the tape elements T to the completed coil C are substantially the same for each element, irrespective of whether it is on the front or rear side of the machine, and, therefore, only the machine elements on the front side of the machine cooperating with the pusher elements 314 and 316 will be described in detail, it being understood that the underlying principles for the other on the rear side are the same.

Referring now to Figs. III and V, the winding form F is shown with cutouts 326 in each portion of the winding form positioned on the head piece and tail piece respectively, which are in alignment when the form is closed to expose the turns of the completely wound coil in four symmetrical locations, two on each coil side, of which, however, only one is used on the rear side of the machine, the upper one preferably as is shown on the coil C in Fig. I. After the coil C is fully wound, after 108° of rotation of the countershaft, the taping elements, mounted on a hinged plate 327 of the machine, moving about pivot shaft 328 (Fig. V), affixed in the frame, are moved into cooperative relation with the winding form F by cam 330 positioned on the cam drum 67, at about 140° of rotation of the countershaft 41 (Figs. IV and XXXXII). The cam 330 has cooperating with it arm 332 affixed to a transverse rotatable shaft 334 which, in turn, drives another arm 336 to move a connecting rod 338 which moves the taping elements about its pivotal shaft 328 as is best seen in Fig. V. Prior to this time, the taping elements have been in retracted position for their preparatory phase as hereinbefore described, which continues to about 140° of countershaft rotation, but when the cam 330 actuates the lever system (332, 334, 336, and 338), the preparatory phase is completed and the tape element T is ready to be attached to the coil side.

During the preparatory phase of the action of the taping mechanism, it is necessary to remove the tape from storage rolls 340 and to advance the free end thereof to a forward location adjacent the exposed coil side as it is positioned in the coil form F. Just prior to the hinged movement of the mechanism about the shaft 328, as brought about by the cam 330, it is necessary to cut off from the free end of the tape a short piece thereof to form the tape element T as finally positioned on the coil side. The elements necessary to attain these functions are all positioned on the hinged portion movable about the shaft 328, there being three mechanisms for this purpose, all alike as to form the three tape elements T as finally positioned on the completed coil C. There are, therefore, also provided three storage rolls 340, two on the front side of the machine and one on the rear side as is best seen in Fig. III. The power to move these elements is derived from the shafts 302 and 320 already described, acting first through the pusher elements 310 and 314 during the preparatory phase, and later through the pusher elements 312 and 316 in the attachment phase as will be described hereinafter.

Due to the tacky nature of the tape, which is preferably of the pressure adhesive type, the taping elements during the preparatory phase must move smoothly and at relatively low speed so as to prevent tearing of the tape. The preparatory phase is, therefore, started at approximately 340° of rotation of the countershaft and continues through to 360°, then from zero degrees to about 140° of rotation in the next cycle. The removal of the tape from the storage rolls begins then at about 340° of rotation of the cycle previous to the one in which it is to be positioned on the coil C. The storage rolls 340 are mounted for rotation on the hinged plate 327 on the forward side of the machine by a bracket 342, being held in place by a removable central bolt 344 which allows removal of depleted rolls and the positioning of full rolls on the machine during operation.

The free end 346 of the tape is removed from the roll 340 by a pull exerted thereon to cause the roll to rotate in a counterclockwise direction (Fig. VII). The pull on the tape is created by the rotation of knurled drivers 348 mounted for rotation with a shaft 350, which also cooperates with an overrunning clutch 352, which allows only counterclockwise rotation of the shaft and drivers, so that the tape is always advanced to a forward position toward the winding form F. The shaft is conveniently journaled in suitable bearings adjacent its lower end and also adjacent its center between the two knurled drivers and is provided at its upper end with a knob K for convenient manual manipulation when the tape must be replaced. The shaft, including the drivers, is rotated through the agency of the overrunning clutch by a rack and gear driving means, the gear 354 being attached to the driving portion of the overrunning clutch, which, when rotated in a counterclockwise direction by the rack 356, rotates the shaft and the drivers in the same direction. However, when the gear is rotated in a clockwise direction by the rack, the clutch "overruns" and no rotation is transmitted to the shaft and drivers, which remain stationary.

The tape end 346 contacts the drivers 348 with its tacky surface for approximately 120°, the surface of the drivers being knurled to prevent sticking thereto by too large a gripping surface. The tape is also threaded over guide rollers 358 adjacent the rolls 340 which contact the non-tacky side of the tape as shown. The guide rollers are conveniently journaled for rotation on stub shafts 360 mounted in the hinged member 327.

The rack 356 is driven in a reciprocating motion by a sliding head 362 mounted on the hinge member 327 by a spring-urged lost motion connection 364 for a purpose to be described hereinafter. The outer end of the sliding head is provided with an abutment 366 which is contacted by the pusher 314 when the hinged member 327 is in retracted position to motivate the preparatory phase of the taping mechanism. This is clearly shown in Fig. XXIV, where the pusher 314 has just actuated the sliding head to its innermost position, while the normal condition is shown in dotted lines. The actuating mechanism for the pusher 314 has already been described above.

When the sliding head 362 is advanced by the pusher 314, the rack 356 is also advanced, which rotates the gear 354 and the shaft 350 is a counterclockwise direction through the agency of the overrunning clutch 352, so that the knurled drivers 348 are also turned in the same direction as already described. This advances the tape end toward the winding form F, as is most clearly shown in Figs. XXVII and XXVIII, the first figure showing the starting position. The tape after leaving the knurled driver 348, partially embraces on its non-tacky side a rounded projection 368 which terminates in a flat surface 370 on which the tape slides as it is advanced by the driver 348. The sliding tape is guided to prevent curling by a footed link 372 also having a flat face 374 parallel to the surface 370 which resiliently contacts the tacky side of the tape as shown. The footed link 372 is pivotally attached to the sliding head 362 by the stud 376 and advances toward the winding head at the same speed at the tape is pushed forward by the driver 348. The resilient contact is obtained by a spring 378 cooperating by a mechanism to be further described hereinafter.

The tape is, therefore, advanced by the combined action of the knurled driver 348 and the footed link 372, and moves a predetermined distance forwardly over a narrow slot 380 which houses a cutter 382, where the surface is provided with a stepoff 383 and thence over a chamfered slot 384 which will later cooperate with the coil side of a fully wound coil as will be described further at a later time when the taping device moves into cooperation with the slots 326 of the winding form F. After the tape has advanced a predetermined distance over both slots 380 and 384, as controlled by the size of the coil to which the tape element T is to be fitted, the tape is stopped by a brake mechanism 386, which locks the shaft 350 to prevent further rotation of the driver 348. The linear movement of the footed link 372 continues and advances beyond the end of the tape and moves over a gradual dropoff 385, so that the contact between the surface 374 on the foot is gradually broken with the sticky or tacky side of the tape, the pull being longitudinally of the tape and also at a slight angle at the end due to the dropoff 385, so that curling thereof after the separation is prevented. This leaves the tape in its advanced position over both slots 380 and 384, the footed link being retracted after being lifted from the plane of the tape by a mechanism to be further described.

Returning now to the brake mechanism 386 which stops the rotation of the shaft 350 and the advance of the tape 346, reference is had to Figs. XXXIX, XXXX, and XXXXI where its details are shown. Immediately above the gear element 354 and preferably integral with the lower knurled driver 348, a sheave 388 is provided which cooperates with an arcuate chamfered arm 390 loosely pivoted on the stud 392 on the hinged member 327. The arm 390 is resiliently urged into engagement with the sheave 388 by a spring 394 seated in a bore 396 as shown. On the distal end of the arm 390, a projection 398 is provided which overrides the rack 356 and contacts an upwardly projecting pin 400 thereon to jam the arcuate chamfered portion of the arm 390 into the sheave to form the lock for the shaft 350 and the driver 348 for preventing any further relative movement between the parts. The sheave 388 and the upper and lower knurled drivers 348 are all affixed to the shaft 350, while the gear 354 is affixed to the driver portion of the overrunning clutch 352, the driven portion of which is also affixed to the shaft 350.

As the pin 400 on the rack 356 contacts the projection 398 on the arm 390 to lock the elements together to prevent further forward movement of the tape end 356 as has been already described, further movement of the sliding head 362 is necessary in order that the foot 374 may advance to break its contactual relation with the tacky side of the tape as shown in Fig. XXVIII and as has been already described. Inasmuch as the rack 356 is locked against movement by the pin 400 abutting against the projection 398, further movement thereof is impossible, and the additional movement of the sliding head 362 is allowed by the lost motion connection 364 already referred to and shown in Fig. VIII. The lost motion connection consists of a helical spring 402 fitted on an integral cylindrical portion 404 of the rack member, the spring seating against a shoulder 406 at the terminus of the rack and against a depending portion 408 of the sliding head 362, which is provided with a suitable aperture, through which the cylindrical portion 404 projects with a sliding fit, being provided with lock nuts 410 on the distal end to limit the expansion of the spring 402. It is obvious that the spring 402 will be compressed when the sliding head 362 is further advanced with the occurrence of the abutting relation between the pin 400 and the projection 398 already described. The cylindrical portion 404 will be displaced through the aperture of the depending portion 408, to allow the spring biased motion of the sliding head 362.

After the foot 374 has broken its contactual relation with the tacky side of the tape end 346 by continuing to move forward after the tape is locked by the action of the brake mechanism, as already described, the foot is lifted up from the tape and retreats to substantially its initial position, as is best seen in Fig. XXIX. The mechanism to obtain the lifting up of the foot 374 is set in motion on the forward stroke of the whole lever as pivoted on the stud 376, so that, on its return stroke, which is motivated by resilient means 412 attached on one end on pin 414 affixed to a portion of the sliding element 362 (to be further described hereinafter) and anchored at the other end on a pin 416 on the hinged element 327, so that the sliding element 362 extends the resilient means 412 as it moves forward, which is assisted by the spring 402 after the locking of the shaft 350 occurs. The return stroke of the sliding element 362 is brought about by the action of these three springs.

Pins 414 also form pivots for arms 418, which lie substantially parallel to the links 372, the two being urged into contactual relation by spring 378 as already described. In the preparatory phase of the taping device, the arm 418 is inactive but it moves in and out with the sliding element 362 in this phase even though it has no function to perform in so doing. The arm 418 is mounted on a separate slide 420, which has an abutment 422 which locks with the abutment 366 on the sliding element 362 by a shoulder 424 as is best seen in Figs. XXIV, XXV, and XXVI. These parts become active in the attachment phase as will be described later.

The slide 420 is provided with a T-shaped member 426, the arms of the T overlying the arms 418 to form anchors for the springs 378 which urge the arm 418 and the link 372 into cooperative relation as has been described. The arm 418 is provided with a boss 428, as is best seen in Fig. VIII, to give this contactual relation which is adapted to slide along the outside of the link 372 when relative movement is had between these members.

Both the upper and lower pair of links 372 and arms 418 are held on their respective pivot pins 376 and 414 by a bridge member 430 which is fixedly attached to the hinged member 327, having four arms 432 projecting outwardly to contact the upper and lower sides respectively of the pairs as is best shown in Figs. VIII and IX. The base of the bridge member 430 is slotted to slidably mount a pair of cam members 433 which are urged apart by a spring 434 seated in each cam member, so as to contact the cams with the upper and lower links 372 on the side opposite from the arms 432, against which they bear on a slidable relation as is best seen by comparing Figs. VIII and IX showing two different positions of these elements. The relation between these cam elements or members 433 and the links 372 provide the means whereby the foot thereof is lifted up from the tacky side of the tape end 346 on the return stroke as shown in Fig. XXIX.

The links 372 on the side opposite from that on which contact is made with the arms 432 are provided with cam projections 436, which embody three separate cam surfaces to cooperate with the cam members 433, which also has two cam surfaces. Referring now to Fig. VIII, these cooperating cam surfaces on the links 372 and the members 433 are most clearly seen with the lower link. At the beginning of the stroke of the link 372 in the preparatory phase in which the tape element T is gotten ready for positioning on the side of the coil C, which is being wound by the rotating coil form F during this phase, the forward cam surface 438 on the projection 436 of the link is in contact with the lower cam surface 440 of the member 433 as shown in Fig. VIII. As the link 372 is pushed toward the slots 380 and 384, the member 433 is displaced against the bias of the spring 434, so that the lower surface 442 of the member 433 rides the upper surface of the projection 436, which continues until the foot of the link is beyond the coil slot 384 and cooperating with the drop off 385 for the purpose of releasing the foot from the tacky side of the tape as already described. It will be noted that the link has on its inner side a step 444 which cooperates with the bridge member 430 under the influence of springs 378 to allow the foot to move over the drop off 385 by being displaced toward it to assure a smooth release of the foot from the tacky tape side, which, if released by a straight line motion of the foot, would place considerable tension on the tape in a longitudinal direction to give a sudden release to cause the tape to snap back in the direction of the rollers 348 and give non-uniform tape elements over the slot 384. With the foot of the link moving down the angularly arranged drop off 385, as allowed by the step 444, the tape will be released from the flat surface 374 first, but contact between the foot at its rear trailing edge 374a will still remain in cooperation with the drop off 385 with the tacky tape side, so that the tension on the tape will be at a minimum and a smooth, steady release of the tape end will be accomplished without snap backs, so that the release of the tape end will be substantially uniform over the coil slot 384, to assure uniform tape elements T as positioned on the sides of the coil C.

After the foot of the link 372 has been released from the tacky side of the tape, the cam projection 436 thereof has advanced with reference to the member 433 to a position where the forward cam surface 446 of the member 433 drops behind the rear cam surface 448 of the projection 436 under the influence of the spring 434. At this point, the link 372 is in its most advanced position and now begins to move backward to its original position, and, in so doing, the contactual relation between cam surfaces 446 and 448 on the member 433 and the link 372 respectively, raise the link about its pivot 376 and its foot and also the inactive link 418, against the bias of springs 378 to clear the tape in its retreat as is best shown in Fig. XXIX. When the link 372 has moved to substantially its original position, the forward cam surface 438 on the link again drops behind the lower cam surface 440 of the member 433 to prepare the elements for a new cycle of operation. With the drop of the link 372, its foot with its plane surface 374, again contacts the tacky side of the tape just behind the cutter slot 380, where it firmly holds the tape during the cutting operation by the cutter 382 as will be further described hereinafter.

The return of the link 372 to its original position, as shown in Fig. XXIX, with the tape end 346 extending beyond the wire slot 384, closes the preparatory phase with about 108° of rotation of the countershaft as already described. Now the attachment phase begins wherein the tape elements T are affixed to the sides of the coil C, which at 108° of rotation is fully wound and ready for the attachment of the tape elements. It is at this point that the hinged member 327, carrying the three tape attaching mechanisms, is moved into cooperative relation with the winding form F by the mechanism shown in Fig. V, already described hereinbefore.

The cam 330 on the drum 67 begins to move the hinged plate 327 at about 100° of rotation of the countershaft 41 as is shown in the graph entitled "Taping Frame" in Fig. XXXXII. At approximately 130° of rotation, the hinged member 327 is moved its maximum distance so as to place the exposed coil sides in the slots 326 into the slots 384, over which extend the free ends of the tapes 346 with the tacky tape sides embracing the coil side as is best seen in Fig. XXX. It will be noted that the coil sides depress the tapes down into the slots 384 as shown, which causes the end of the tape to move outwardly away from the drop off 385 and project directly out from the coil side where it is in a position to cooperate with the finger of the link or lever 418 as will be described hereinafter.

While the hinged frame 327 has been moving into cooperative relation with the winding form F, the slide H which carries the guide G and wire cutters have also been moving into cooperative relation with the winding form F through the action of the cam 119 on cam drum 67, as is clearly shown in Fig. XVIII. The action of these elements is substantially the same as described in the aforementioned Weber patent and they will not be further described. The finger 85, for removal of the finished coil from the winding form F, is actuated at the same time by cam 85a on the end of the drum 67 by a suitable pivoted linkage moving about pivots 85b, as shown in Fig. XVIII, the finger being spring-retracted if desired. The timed relation of the finger 85 is shown by the graph entitled "Coil Ejector Finger" in Fig. XXXXII, while that of the head H is shown by the graph entitled "Wire Cutter" in the same figure.

The wire cutter is actuated to sever the trailing end of the coil at approximately 135° of rotation of the countershaft 41, by having the pin 446 on the movable element 448 of the cutter move down an oblique slot of a plate, against the bias of a spring. The cutters act to shear the wires to cut the fully wound coil free from the continuous strands.

The notch N in the guide G has already gathered the strands together and pushed them into the jaws of the gripping mechanism, which is then actuated by the bellcrank 99 to provide a new grip on the leading ends of the wires for the next consecutive coil to be wound. The actuation of this mechanism has already been described and occurs at approximately 155° of rotation of the countershaft 41. This prepares the wires for the beginning of a new winding cycle, but before the completed coil can be removed from the winding form F, the tape elements must be attached to its sides, as will now be described.

As has hereinbefore been described, the hinged element 327, carrying the taping mechanism, has been moved into full cooperation with the coil form F after 140° of rotation of the countershaft substantially as shown in Fig. XXX and immediately thereafter the tape cutter 382 housed in slot 380 is actuated to sever the tape elements T from the free ends 346 of the tape. The details of the tape cutter are shown in Figs. XXXV, XXXVI, XXXVII, and XXXVIII, and further details of the actuating mechanism are shown in Figs. XXIV, XXV, and XXVI.

Referring first to the actuating mechanism, the effect of the movement of the hinged element 327 by the mechanism shown in Fig. V on the actuating mechanism of the complete taping device is shown in Figs. XXIV, XXV, and XXVI, wherein Fig. XXIV shows the actuation of the taping device during the preparatory phase, the driving relation being shown in Fig. VI with the pusher 314 contacting abutment 366. This driving relation is active from about 220° of rotation of the countershaft 41 through 360° and then to approximately 100° of the next consecutive turn as is best seen by referring to the graphs shown in Fig. XXXXII. At 100° of rotation, the hinged element 327 is moved into active relation with the winding form F to bring about an active driving relation between pusher rod 316 and abutment 422 on the slide 420 and also moves the elements in alignment which actuates the tape cutter 382 as shown in Figs. XXXVI, XXXVII, and XXXVIII which will now be described in detail.

The tape cutter 382 is preferably a serrated edge, sharpened to a cutting edge, so that it consists of a series of sharp points penetrating the tape as is shown in Fig. XXXV. At a central location, the cutter is clamped in an angle 454 to allow renewal which is fixedly attached to a pivoted lever 456, rotatable about its pivot 458 under the bias of spring 460 in a clockwise direction to move the cutter 382 to its retracted position against a stop 462. The cutter 382 is positioned in the slot 380 as already described, just behind the coil slot 384 as is best seen in Figs. VIII, XXVII to XXXIII inclusive. The position of the angle 454 between the two tape ends 346 is best seen in Fig. VIII, which also shows the free end of the lever 456 between the two rolls of tape 340. The pivot point 458 is shown in Fig. VII as a part of the hinged element 327, this figure also showing the stop 462 and the general arrangement of the lever 456 in the taping mechanism.

During the preparatory phase of the taping mechanism, that is, before 108° of rotation of the countershaft 41, the cutter 382 is not in a position to be actuated, inasmuch as the end of the lever 456 is positioned above the arm 324 with its pusher elements 314 and 316 in this phase as is best seen in Fig. III. It is only after the hinged element has been moved into cooperative relation with the winding form F, as already described, and against its adjustable stop 464 (Fig. III), that the end of the lever 456, makes contactual relation with cam block 466. Figs. XXXVI to XXXVIII inclusive positioned on an upwardly projecting portion 468 of the arm 324 above the level of the pusher element 314, by a pivoted lug 470, attached by pin 472 on its end, the lug 470 being biased by spring 474 against a shoulder 476 on the end of the lever. When the lug 470 is urged in a clockwise direction about its pivot by the cam block 466 being moved inwardly by the arm 324, it locks against the shoulder 476 to cause displacement of the whole arm 456 and the cutter 382 positioned on its distal end in a counterclockwise direction about its pivot 458, as is shown in Fig. XXXVII. This moves the cutter 382 from its slot 380 to sever a tape element T from the tape end 346 which is held over the slot 380 by the coil side positioned in the slot 384 and the foot of the link 372 as is best seen in Figs. XXX and XXXI. The cutter is actuated in the early phase of the attachment phase at about 142° of rotation of the countershaft 41 as is seen by referring to the first graph entitled "Tape Feed and Tape Wrap" in Fig. XXXXII.

On the return stroke of the arm 324, the cam block 466 rotates the lug 470 in a clockwise direction about its pivot 472 against the bias of the spring 474, so as to allow easy passage thereof, for the next cycle of operation as shown in Fig. XXXVIII. After the cutting of the tape element T, the cutter 382 is returned to its slot 380 by the spring 460 as is well understood.

Returning now to the second inward stroke of the arm 324 as is brought about by the second lobe on the cam 304 (Fig. VI) which is active between 140° to 200° of rotation of the countershaft 41, the action of the first lobe of the cam having been already described in connection with the preparatory phase, it will be noted that in this phase, the tape element is severed (as already described) and attached to the coil side, the coil having already been wound, and the taping mechanism moved into cooperation with the winding form as described. The movement of the taping mechanism by the action of the hinged element 327, shifts the mechanism from its cooperative relation with the pusher element 314 to a cooperative relation with the pusher element 316 both positioned on the arm 324 which makes two inward strokes per revolution of the countershaft 41 as already described. In the early phase of the second stroke of the arm 324, the tape cutter 382 is actuated, then the pusher 316 makes contact with the abutment 422 on the end of the slide 420 which parallels the first slide element 362. The slide element 362 actuates the link 372, while the second slide 420 actuates the link 418 positioned in parallel relation with the footed link 372 whose functions have already been described. The two slides 362 and 420 are locked together during the first inward stroke initiated by the pusher element 314, the slide 420 and its link 418 having no active function to fulfill in this phase. During the second inward stroke of the arm 324, the slide element 362 is inactive and does not move, and the only function it fulfills is to hold the foot of the link 372 against the surface 370 with its face 374 against the tacky side of the tape behind the slot 380 whereby the tape cutter 382 is aided during the cutting operation by having the tape end firmly held in position over the slot 380. The slide 362 is biased to inactive position by spring 402 (Fig. VIII).

When the tape cutter 382 is actuated by the initial movement of the arm 324 in this phase to cut the tape as shown in Fig. XXXI, the end of the tape element T just cut will move out from the plane of the surface 370 to align itself with approximately the plane of the side of the coil slot 384 as is clearly shown in the drawing. This makes it available for cooperation with the arcuate finger 478 on the end of the link 418, the inward movement of which toward the coil side begins after the completion of the cutting of the tape element by the pusher element thrusting against the abutment 422 to move the slide away from the shoulder 424 against the bias of the springs 412, which also moves the link 418 pivoted to the slide. At first, the finger 478 will ride down the forward face of the footed link 372 under the bias of springs 378 until abutment 428 (Fig. XXX) on the inner side of the link 418 rests on the outer side of the inactive link 372, along which it slides to prevent possible interference with the slots 380 and 384 housing the cutter blade and coil side respectively. As the arcuate end of the finger 478 moves inwardly along approximately the plane of the surface 370, it picks up th severed end of the tape element T, and pushes the tacky side thereof in contact with the coil side as shown in Fig. XXXII, this end of the tape element being long enough to extend completely across the coil side and cause the two tacky sides of the ends of the tape element to make contact. This places the tacky side of tape to the tacky side of tape on the two ends of the tape element T, the contactual area being relatively small as shown in Fig. XXXIV but being sufficiently large to give a firm grip to the ends of the embracing tape element. The finger then continues to move inwardly to overrun the tacky side of the tape element on its opposite end as shown in Fig. XXXII. The springiness of the tape end pulls the non-tacky side away from the surface 385, so that it extends upwardly to allow the finger 478 to get behind it, so that on the return stroke of the finger, the tacky side remaining exposed is folded back over to overlie the first end as is shown in Fig. XXXIII. Just as the finger 478 moves across the last portion of the coil side, the winding form F is opened with the ejector finger 85 pulling the coil from the form (Fig. XXIII), so that a slight turning of the coil is accomplished which tends to give extra pressure on the last end of the tape to be attached, to thereby improve its contact with the outer side of the tape element for greater strength in holding the coil in shape after its removal from the machine. The slide 420 returns to rest against the shoulder 424 and the hinged element 327 is retracted to its original position to begin the preparatory phase for the next coil.

Each of the three separate mechanisms for attaching the three tape elements T to the coil sides follow the same procedure, in the same way.

The coil winding form F is opened by the cam path 68 (Fig. IV), the slide H mounting the guide G and the wire cutters are returned to retarded position and the ejector finger 85 pulls the completed coil from the form, so that it drops by gravity into a hopper below the winding form. The coil winding form F begins to close again at approximately 300° of rotation of the countershaft and is closed just before 360° of rotation, so that a new cycle of winding may begin. The leading end of the wire strands W are locked in the head 92 to form the leading end of the next consecutive coil to be wound. The machine is automatic and suitable for continuous operation.

The tape used with the hereinbefore described machine is known as Scotch Electrical tape having a flat paper backing with an adhesive which is pressure sensitive, thermally reactive and incorporating a thermally setting resin. After the taped coils are positioned in the slots of a generator armature, the assembly is dipped in varnish and heat-treated, so that the tape used must have the characteristics mentioned to be used successfully for the intended purpose.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a device of the class described, an intermittently rotatable winding form separable in a plane transverse of the axis of rotation for winding coils from continuous strands of wire, slots in the winding form to expose a portion of the coil sides, a tape applicator including a slot conformed to compress the coil sides when applied thereto in the winding form slots when the winding form is stationary, means to position the end of the continuous strand of tape having a tacky side over the slot of the tape applicator by contacting the tacky side of the tape, means to cause relative movement between the winding form and the tape applicator whereby the coil side is compressed together in the slot and pressed against the tacky side of the tape element positioned over the slot when the winding form is stationary, means to cut the tape element from the continuous strand, means for folding the outwardly extending ends of the tape element over each other with end portions of the tacky side in contact with each other to embrace the coil side, means for opening the winding form, means for removing the completed coil with the tape element attached thereto from the winding form, and means for automatically actuating said elements in timed relation for continuous cyclic operation of the device.

2. In a device of the class described, an intermittently rotatable winding form for winding coils from continuous strands of wire, slot means in the winding form to expose a portion of a fully-wound coil side, tape applicator means including a slot formed to compress the coil side when the slot is applied thereto in the winding form slot means when the winding form is stationary, means to position a tacky tape element over the slot of the tape applicator means, means to cause relative motion between the stationary winding form and the tape applicator means whereby the coil side is compressed into the slot against the tacky side of the tape element which thereafter extends outwardly therefrom, means for folding the outwardly extending ends of the tape element over the coil side with a portion of the tacky tape sides in contact and over each other to embrace the coil side, and means for automatically operating the machine elements in timed relation for cyclic operation.

3. In a device of the class described, an intermittently rotatable winding form separable in a plane transverse of the axis of rotation for winding coils from continuous strands of wire, slot means in the winding form to expose the coil sides, a tape applicator including a slot formed to compress the exposed coil side when the slot is applied thereto, when the winding form is stationary, means to position a tape element over the slot of the tape applicator, driving means for the winding form and the applicator during a preparatory phase wherein the coil is wound from the continuous strands of wire and the tape element is positioned over the slot, means to cause relative motion between the coil form and the tape applicator whereby the exposed coil side of the completely-wound coil is pressed into the slot against the exposed tacky side of the tape element positioned thereover, means for folding the ends of the tape element over each other to embrace the coil side, and means to operate the elements of the device in timed relation for continuous cyclic operation.

4. The device defined in claim 3 further characterized by a hinged construction of the tape applicator which moves into cooperative relation with the relatively stationary coil winding form to attach the tape element to the side of the completely-wound coil positioned in the winding form.

5. The device defined in claim 1 further characterized by a reciprocating means cooperating with the tacky side of the tape to position the end of the continuous strand of tape over the slot of the tape applicator.

6. The device defined in claim 1 further characterized by a reciprocating finger cooperating with the outwardly extending ends of the tape element whereby they are folded over each other to embrace the exposed side of a completely-wound coil.

7. The device defined in claim 1 further characterized by a driven rotatable means cooperating with a reciprocating means to control the length of the tape element and to position the end of the continuous strand of tape over the slot of the tape applicator.

8. The device defined in claim 1 further characterized by a driven rotatable element to advance the end of the continuous strand of tape over the slot by cooperating with a reciprocating element contacting the tacky side of the tape end; with locking means for the rotating element to allow locking of the continuous strand of tape to control the length of the taped element and to release the reciprocating element from the tacky side of the tape end.

9. In a device of the class described, an intermittently rotatable winding form separable in a plane transverse of the axis of rotation for winding coils from continuous strands of wire, slot means in the winding form to expose the coil sides of a completely wound coil, a tape applicator including a slot formed to compress the exposed coil side when the slot is applied thereto when the winding form is stationary, reciprocating means to position a tape element over the slot of the tape applicator, driving means for the winding form and the applicator during a preparatory phase wherein the coil is wound from the continuous strands of wire and the tape element is positioned over the slot, means to cause relative motion between the coil form and the tape applicator whereby the exposed coil side of the completely-wound coil when the winding form is stationary is pressed into the slot against the exposed tacky side of the tape element positioned thereover, means to cut the tape element to predetermined length, means for folding the ends of the tape element over each other to embrace the coil side, means to eject the coil from the winding form, and automatic means to operate the elements of the device in timed relation for continuous cyclic operation.

10. In a device of the class described, an intermittently rotatable winding form separable in a plane transverse of the axis of rotation for winding coils from continuous strands of wire, slot means in the winding form to expose the coil sides when the winding form is stationary, a tape applicator including a slot formed to compress the exposed coil side when the slot is applied thereto, means to position a tape element over the slot of the tape applicator from a continuous strand of tape, driving means for the winding form and the applicator during a preparatory phase wherein the coil is wound from the continuous strands of wire and the tape element is positioned over the slot from the continuous strand of tape, means to cause relative motion between the relatively stationary coil form and the tape applicator whereby the exposed coil side of the completely-wound coil is pressed into the slot against the exposed tacky side of the tape element positioned thereover, means to cut the tape element to predetermined length, means for folding the ends of the tape element over each other to embrace the coil side, means to eject the taped coil from the stationary winding form, and automatic means to actuate the elements of the device in timed relation for continuous cyclic operation.

References Cited in the file of this patent

UNITED STATES PATENTS

| | | |
|---|---|---|
| 1,401,519 | Clauss | Dec. 27, 1921 |
| 1,797,173 | Matson | Mar. 17, 1931 |
| 1,927,708 | Pieczentkowski | Sept. 19, 1933 |
| 1,934,471 | Kerr | Nov. 7, 1933 |
| 1,946,717 | Snyder | Feb. 13, 1934 |
| 1,949,544 | Matson | Mar. 6, 1934 |
| 1,981,946 | Collins | Nov. 27, 1934 |
| 2,154,792 | Weber | Apr. 18, 1939 |
| 2,246,608 | Taylor | June 24, 1941 |
| 2,367,086 | Barry | Jan. 9, 1945 |
| 2,445,109 | Ferguson | July 13, 1948 |
| 2,569,513 | Burge | Oct. 2, 1951 |
| 2,624,374 | Burge | Jan. 6, 1953 |